Dec. 12, 1961   C. E. WING   3,013,241
CURRENT-RETURN PIPE CLAMP
Filed July 20, 1959
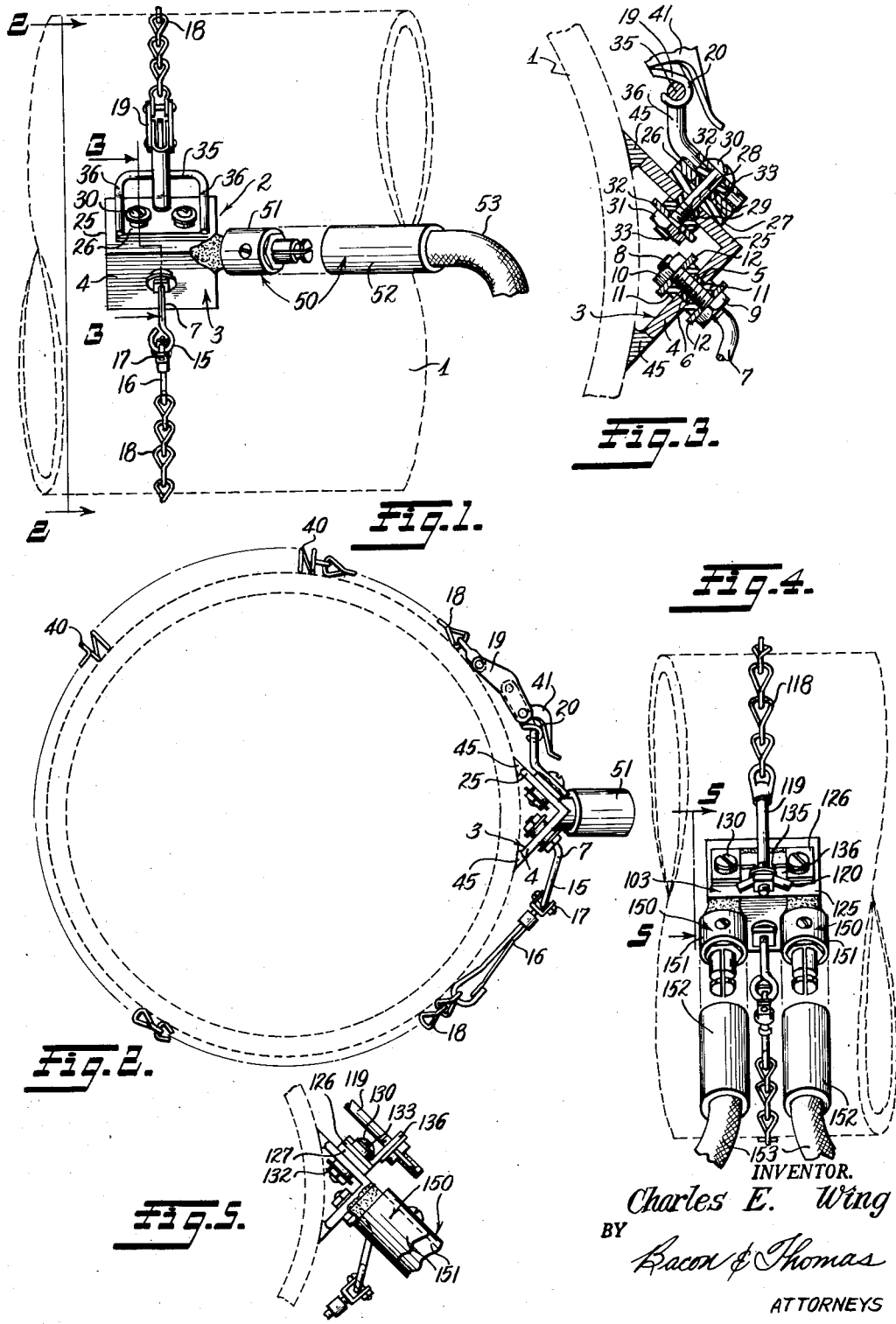
INVENTOR.
Charles E. Wing
BY
Bacon & Thomas
ATTORNEYS

United States Patent Office

3,013,241
Patented Dec. 12, 1961

3,013,241
CURRENT-RETURN PIPE CLAMP
Charles E. Wing, 1069 S. Gardiner Drive,
Bay Shore, N.Y.
Filed July 20, 1959, Ser. No. 828,233
4 Claims. (Cl. 339—14)

This invention relates generally to a connection device for use in the work-in-circuit welding of large pipes and for other types of operations involving the provision of a return or "ground" connection electric current.

In conventional welding operations where a connection of the instant type is required, it is effected by cleaning a small section of the pipe's outer surface, welding a stub-shaped projection thereto, and connecting the return lead to the projection by clamps or the like. The difficulties in this procedure are obvious and after welding the projection remains on the surface of the pipe unless the further step of removing this projection is undertaken. There is no practical way to attach a return lead without some sort of time-consuming procedure such as outlined above, and no satisfactory method or apparatus has been devised to overcome this difficulty. Most expedients which have been tried in this connection have led to serious problems of arcing between the pipe and the return connection.

It is herefore a primary object of the present invention to provide a work-contacting connection device for welding apparatus where little or no arcing occurs in spite of the high currents which must be employed.

Another primary object is to provide a connection device which may be readily applied to and removed from the work piece, and one which may be employed with different work pieces including pipes and conduits of varying sizes.

Another object is to provide a connection device wherein good contact is made with the work piece to prevent any possibility of arcing with the resultant pitting, loss of power, disfiguring of the work piece, etc., which would stem therefrom.

A further object is to provide a return connection device having a contacting surface which is particularly well-adapted for use with pipes of varying diameters.

Another object is to provide a return connection device which is firmly secured to the work piece in operation and wherein the securing means are readily altered to suit the particular size of work piece involved.

Another object is to provide a return connection wherein the electrical connector and cable means are positioned outwardly from the work piece to prevent any possible interference therewith and permit convenient manipulation.

Other objects and advantages will be apparent from the following description when taken in conjunction with the accompanying drawings, in which:

FIG. 1 is a side elevaional view illustrating a pipe section shown in dotted lines and having secured thereto a return connection device incorporating the principles of the present invention;

FIG. 2 is a sectional view taken on the line 2—2 of FIG. 1;

FIG. 3 is an enlarged fragmentary sectional view taken on the line 3—3 of FIG. 1;

FIG. 4 is an elevational view similar to that of FIG. 1, showing here a modified form of the device shown in FIG. 1;

FIG. 5 is a sectional view taken on the line 5—5 of FIG. 4.

Referring now more specifically to the drawings, the numeral 1 is employed in FIG. 1 to indicate a fragmentary portion of one pipe section which is to be welded to another section by an arc-welding process. The return lead or "ground" lead connection device, generally indicated by the numeral 2, comprises a section 3 of angle iron or other suitable conductive material, positioned with its concave inner surface facing the outer periphery of the pipe. One leg 4 of the angle-iron section 3 has a centrally disposed aperture 5 therethrough (FIG. 3). An eyebolt 7 has a threaded shank 8 extending through the aperture 5 and secured in position with respect to the leg 4 by inner and outer nut members 9 and 10. An insulating sleeve 6 in aperture 5 serves to prevent electrical contact between shank 8 and leg 4. Each nut member is positively spaced from the leg 4 by inner washers 11, formed of rubber or any other suitable insulating material, and by steel outer washers 12. The outer end of the eyelet comprises a ring 15 and is bent inwardly to a plane generally parallel with the surface portion of the work piece which it overlies. A conventional clip 16 may be secured as by nut-and-bolt connection 17 to the ring 15, and clip 16, in turn, serves to connect the device 2 to a chain 18 surrounding the pipe section 1.

The opposite end of chain 18 is provided with a conventional toggle-lock clamp 19 having an outer hook member 20. A plate 26 is positioned over the outer face of the second leg 25 of angle iron section 3, and is spaced therefrom by a sheet of insulating material 27. Aligned apertures 28 are provided in the plate 26, sheet 27, and leg 25, for the passage of two or more connecting bolts 30, and suitable insulating sleeves 29 are provided in the apertures 28 of plate 26 and leg 25 to prevent electrical contact with bolts 30. Nuts 31 are secured at the bottom of bolts 30 and the nuts and bolt heads are spaced from the inner face of leg 25 and the outer face of plate 26, respectively, by outer steel washers 32 and inner insulating washers 33.

It will thus be seen that the contacting angle-iron section 3 is effectively insulated from electrical contact with the securing means, i.e., with chain 18 and its connections, to the angle iron. Thus, no arcing can occur between the chain 18 and the work piece 1.

A rigid bar 35 is positioned outwardly of leg 25, and is connected to plate 26 as shown clearly in FIGS. 1 and 3, by parallel leg members 36. Leg members 36 are bent slightly to increase the radial distance between the bar 35 and the work piece, and are secured to plate 26 by brazing or the like. The bar 35 thus provides a firm connecting point for the outer hook member 20 of clamp 19.

A strong helical spring 40 is interlinked in the chain 18. Thus, when the chain has been adjusted for approximately the correct length for the particular workpiece involved, it can be readily wrapped therearound with the assembly being hooked together by hook member 20 and locked by operation of the toggle lock actuating lever 41. Spring 40 serves to take up any slack.

A pair of pads or foot members 45 are secured along the outer edges of legs 4 and 25 for contact with the outer surface of the pipe. The pads 45 are preferably formed of copper or some other soft and conductive material, and therefore readily adapt themselves to the particular contour of the work piece involved and shape themselves to accommodate slight surface irregularities. They may be secured to angle iron section 3 by brazing or the like.

A separable connector 50 of any suitable construction, but preferably of a snap-action type, is secured at one side of the device 2. The connector 50 comprises a male member 51 secured as by brazing to the outer surface of angle iron section 3 and extending at an angle with respect to the axis of the workpiece. Female member 52 is connected by a cable 53 to the generator of the welding unit to complete the circuit.

In the modification shown in FIGS. 4 and 5, the essential elements are similar to those illustrated in FIGS. 1-3, and have been denoted by the same numbers in the 100 series. In this instance, chain 118 is connected to the second leg 125 of the angle-iron section 103 by means of a threaded stud 119 having a wing nut 120 secured on its outer end. The wing nut 120 fits in a slot 135 formed in an outwardly extending flange 136 secured to the outer face of plate 126 by any suitable means such as brazing. The plate 126 is in turn secured to leg 125 by bolts 130, and washers 132 and insulating means 133, 127 and 129 are assembled therewith in the manner of the device shown in FIGS. 1 to 3. In the present modification two separable electrical connectors 150 are employed, each of them having a male member 151 extending outwardly from the upper portion of leg 104 generally perpendicularly with respect to the outer face thereof. Female members 152 are each connected to a return lead 153 which are in turn connected to the generators of separate welding units. Thus, two welders employing individual units may work on the same pipe line, either on opposite sides of the pipe or on successive junctures between pipe sections.

While two specific modifications of the invention have been shown and have been described in detail, this is not to be construed as limiting the scope of protection being sought. Numerous other modifications and changes may obviously be made without departing from the spirit of the invention or the scope of the annexed claims.

I claim:

1. A current return connection adapted for attachment to a pipe section, comprising: a pipe-contacting member formed of conductive material and including a pair of interconnected legs adapted to engage a surface of the pipe section; a return lead connection secured on said member to establish electrical contact with said pipe section through said member; securing means connected to opposite side portions of said member and adapted to surround said pipe section for attaching said member in contacting position on the surface of said pipe section; and insulating means interposed between the opposite ends of said securing means and the respective side portions of said member to prevent the flow of electricity between said pipe and said securing means.

2. The connection of claim 1 wherein said pair of interconnected legs terminate at their outer ends in copper pipe-contacting pads adapted to contact said pipe section.

3. A return-lead connection for use with arc-welding apparatus, comprising: an angle-iron section having copper pad members brazed along the outer edges of each leg thereof; a chain member having a spring interlinked therein and being secured at one end thereof to one leg of said angle-iron section; a toggle-lock clamp mounted on the opposite end of said chain; attachment means secured to the other leg of said angle-iron section and adapted to receive said toggle-lock clamp; a snap-action separable return lead connection secured to said angle iron section; insulating means positioned to prevent electrical contact between said angle-iron section and said one end of said chain; and additional insulating means positioned to prevent electrical contact between said angle-iron section and said attachment means.

4. A current return connection adapted for attachment to a pipe section, comprising: a pipe-contacting member formed of conductive material and including a pair of interconnected legs adapted to engage a surface of the pipe section; at least two return lead connections secured on said member to establish electrical contact with said pipe section through said member, said return lead connections serving to connect the member with individual welding units; securing means connected to opposite side portions of said member and adapted to surround said pipe section for attaching said member in contacting position on the surface of said pipe section; and insulating means interposed between the opposite ends of said securing means and the respective side portions of said member to prevent the flow of electricity between said pipe and said securing means.

References Cited in the file of this patent

UNITED STATES PATENTS

| | | |
|---|---|---|
| 1,631,288 | Potter | June 7, 1927 |
| 1,932,602 | Ratta | Oct. 31, 1933 |
| 1,966,132 | Pearson | July 10, 1934 |
| 2,031,921 | Bodendieck | Feb. 25, 1936 |
| 2,489,475 | Blind | Nov. 29, 1949 |
| 2,750,963 | Bond | June 19, 1956 |
| 2,795,770 | Toedtman | June 11, 1957 |